United States Patent
Nordin

(10) Patent No.: US 10,789,097 B2
(45) Date of Patent: Sep. 29, 2020

(54) METHODS AND SYSTEMS OF SCHEDULING COMPUTER PROCESSES OR TASKS IN A DISTRIBUTED SYSTEM

(71) Applicant: Nasdaq Technology AB, Stockholm (SE)

(72) Inventor: Jonas Nordin, Sigtuna (SE)

(73) Assignee: NASDAQ TECHNOLOGY AB, Stockholm (SE)

( * ) Notice: Subject to any disclaimer, the term of this patent is extended or adjusted under 35 U.S.C. 154(b) by 79 days.

(21) Appl. No.: 15/896,857

(22) Filed: Feb. 14, 2018

(65) Prior Publication Data

US 2018/0232255 A1 Aug. 16, 2018

Related U.S. Application Data

(60) Provisional application No. 62/459,722, filed on Feb. 16, 2017.

(51) Int. Cl.
*G06F 9/46* (2006.01)
*G06F 9/48* (2006.01)
(Continued)

(52) U.S. Cl.
CPC ........ *G06F 9/4881* (2013.01); *G06F 9/45558* (2013.01); *G06F 9/5027* (2013.01);
(Continued)

(58) Field of Classification Search
CPC ........ G06F 9/45558; G06F 9/455; G06F 9/54; G06F 9/546; G06F 9/4881; G06F 9/5088;
(Continued)

(56) References Cited

U.S. PATENT DOCUMENTS 5,278,982 A   1/1994  Daniels et al.
9,189,641 B2  11/2015 Syben
(Continued)

FOREIGN PATENT DOCUMENTS

CN   105024879 A   11/2015
WO   2011031459 A2  3/2011
(Continued)

OTHER PUBLICATIONS

Notification of Transmittal of the International Search Report and the Written Opinion of the International Searching Authority, or the Declaration in International Application No. PCT/SE2018/050152 dated Apr. 18, 2018 (15 pages).

(Continued)

*Primary Examiner* — Emerson C Puente
*Assistant Examiner* — Zhi Chen
(74) *Attorney, Agent, or Firm* — Nixon & Vanderhye P.C.

(57) ABSTRACT

A cloud computer system is provided that includes a plurality of computer devices and a database. The plurality of computer devices execute a plurality of virtual machines, with one of the virtual machines serving as a controller node and the remainder serving as worker instances. The controller node is programmed to accept a request to initiate a distributed process that includes a plurality of data jobs, determine a number of worker instances to create across the plurality of computer devices, and cause the number of worker instances to be created on the plurality of computer devices. The worker instances are programmed to create a unique message queue for the corresponding worker instance, and store a reference for the unique message queue that was created for the corresponding worker to the database. The controller node retrieves the reference to the unique message queues and posts jobs to the message queues for execution by the worker instances.

20 Claims, 4 Drawing Sheets

(51) Int. Cl.
*G06F 9/50* (2006.01)
*G06F 9/54* (2006.01)
*G06F 9/455* (2018.01)
*H04L 12/26* (2006.01)
*H04L 12/24* (2006.01)

(52) U.S. Cl.
CPC .............. *G06F 9/5088* (2013.01); *G06F 9/54* (2013.01); *G06F 9/546* (2013.01); *H04L 41/0896* (2013.01); *H04L 43/10* (2013.01); *G06F 2009/4557* (2013.01); *G06F 2009/45562* (2013.01); *G06F 2209/548* (2013.01)

(58) Field of Classification Search
CPC .... G06F 9/5005; G06F 9/5011; G06F 9/5027; G06F 9/5061; G06F 2009/45562; G06F 2009/4557; G06F 2209/548
See application file for complete search history.

(56) References Cited

U.S. PATENT DOCUMENTS

| | | | |
|---|---|---|---|
| 9,400,728 B2* | 7/2016 | Pattnaik | G06F 11/3006 |
| 9,838,277 B2* | 12/2017 | Raney | H04L 43/028 |
| 2005/0289540 A1 | 12/2005 | Nguyen et al. | |
| 2008/0002703 A1* | 1/2008 | Tripathi | H04L 12/42 370/392 |
| 2008/0104608 A1 | 5/2008 | Hyser et al. | |
| 2009/0037498 A1 | 2/2009 | Mukherjee et al. | |
| 2012/0011100 A1 | 1/2012 | Yamane et al. | |
| 2013/0283266 A1* | 10/2013 | Baset | G06F 9/485 718/1 |
| 2014/0064056 A1* | 3/2014 | Sakata | H04L 41/00 370/216 |
| 2015/0032590 A1 | 1/2015 | Fay et al. | |
| 2015/0073970 A1 | 3/2015 | Merold et al. | |
| 2015/0095260 A1 | 4/2015 | Ma et al. | |
| 2015/0212892 A1 | 7/2015 | Li et al. | |
| 2015/0263900 A1* | 9/2015 | Polyakov | H04L 67/10 709/203 |
| 2015/0339572 A1* | 11/2015 | Achin | G06N 5/02 706/46 |
| 2015/0381505 A1* | 12/2015 | Sundararaman | H04L 47/25 370/235 |
| 2016/0094413 A1* | 3/2016 | Jain | H04L 41/5019 709/226 |
| 2016/0104242 A1 | 4/2016 | Melton | |
| 2016/0154662 A1* | 6/2016 | Choi | G06F 9/45558 718/1 |
| 2016/0283599 A1 | 9/2016 | Zonabend | |
| 2016/0292011 A1* | 10/2016 | Colson | G06F 9/5044 |
| 2016/0292672 A1 | 10/2016 | Fay et al. | |
| 2017/0004563 A1 | 1/2017 | Noviello et al. | |
| 2018/0004559 A1* | 1/2018 | Geml | G06F 9/45558 |
| 2018/0165173 A1 | 6/2018 | Lin et al. | |
| 2018/0232462 A1 | 8/2018 | Nordin | |

FOREIGN PATENT DOCUMENTS

| | | |
|---|---|---|
| WO | 2012/049613 | 4/2012 |
| WO | 2013/061217 | 5/2013 |
| WO | 2016/146846 | 9/2016 |

OTHER PUBLICATIONS

International Search Report in Application No. PCT/SE2018/050151, dated Jun. 5, 2018 (6 pages).
Written Opinion of the International Searching Authority, in Application No. PCT/SE2018/050151, filed Jun. 5, 2018 (9 pages).
Nunes et al., AJITTS: Adaptive Just-In-Time Transaction Scheduling, IFIP International Federation for Information Processing, LNCS vol. 7891, pp. 57-70, 2013.
Nonfinal Office Action for U.S. Appl. No. 15/896,875, 16 pages, dated Jan. 21, 2020.

* cited by examiner

METHODS AND SYSTEMS OF SCHEDULING COMPUTER PROCESSES OR TASKS IN A DISTRIBUTED SYSTEM

CROSS REFERENCE(S) TO RELATED APPLICATION(S)

This application claims priority to U.S. Provisional Application No. 62/459,722, filed Feb. 16, 2017, the entire contents of which are hereby incorporated by reference. This application also incorporates by reference U.S. Provisional Application No. 62/459,711, filed Feb. 16, 2017 and an application titled "SYSTEMS AND METHODS OF RETROSPECTIVELY DETERMINING HOW SUBMITTED DATA TRANSACTION REQUESTS OPERATE AGAINST A DYNAMIC DATA STRUCTURE" filed on the same date of the instant application.

TECHNICAL OVERVIEW

The technology described relates to scheduling computer processes or tasks for computer processes. More particularly, the technology described relates to scheduling computer processes, tasks, or jobs in a distributed environment, such a cloud-based computer system.

INTRODUCTION

Cloud computing technology provides for shared processing and data resources (collectively computing resources). This technology allows for provisioning of computing resources on an on-demand basis where client computers can use one to thousands of hardware processors. Individuals and organizations find the flexibility of this technology attractive for handling data processing that can use a large amount of computing resources.

While cloud computing systems may be used to provide an arbitrary number of processing instances (e.g., virtual or physical machines), the actual provisioning of tasks to such resources is typically a static or manual operation. For example, if 50 different virtual machines are created for analyzing weather data, a static configuration will need to be developed that details how those 50 different virtual machines are to be used for the weather analysis process. Static configurations may work in certain implementations when the incoming data and number of virtual machines is relatively constant (e.g., the same amount, same type, etc. . . . ), but may break down when the amount or type of incoming data is (highly) variable. In other words, while one may be able to create an arbitrary number of instances in a cloud-computing environment, to effectively use those machines, the overall process must know how to communicate with those virtual machines to instruct them as to what job to perform.

Thus, new techniques for managing or scheduling tasks or jobs in a distributed, dynamic environment, such as a cloud computing environment (e.g., where there may be an arbitrary number of servers available), are needed. Techniques for providing data or information to an arbitrary number of servers and/or the job processes of those servers is also needed.

SUMMARY

In certain example embodiments, a cloud computer system (system) is provided. The system includes a plurality of computer devices coupled via an electronic data communications network, with each of the plurality of computer devices having at least one hardware processor and electronic data storage. Each device is configured to host at least one virtual machine instance with at least one of the virtual machine instances configured as a controller instance (e.g., a controller node). The system includes a database accessible by each of the virtual machine instances. The controller instance is programmed to accept a request to initiate a distributed process that includes a plurality of data jobs and determine a number of worker instances to create across the plurality of computer devices. Once determined, the controller instance causes a number of worker instances to be created on the plurality of computer devices (e.g., on the cloud computer system). Each of the created worker instances, as part of a initialization process, creates their own unique message queue and communicates with the database to store a reference to the message queue in the database. The controller node is further programmed to read the references to the message queues from the database and publish the data jobs to the messages queues.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Figure 4:
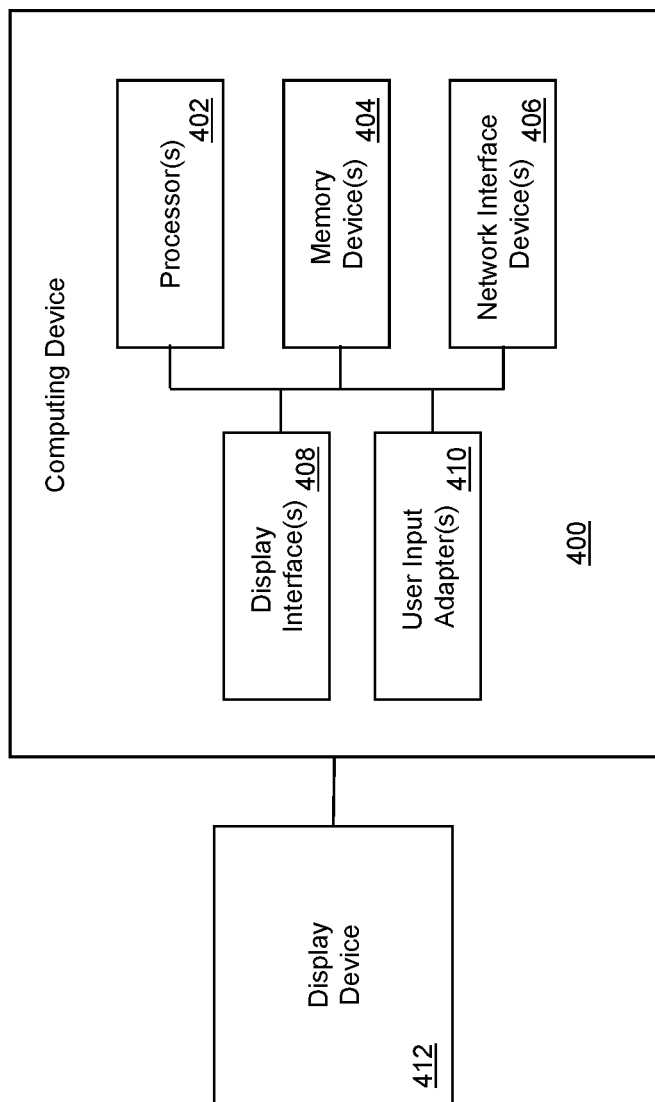
FIG. 4 shows an example computing device that may be used in some embodiments to implement features described herein.

Certain example embodiments described herein relate to cloud computing architecture and systems. In certain examples, a cloud computer system includes hundreds or thousands of different physical computers (e.g., an example computer system is shown in FIG. 4). When clients and users use the processing resources of a cloud computer system, they create worker instances (also referred to as processing instances or instances) that can then execute tasks (e.g., jobs that handle data—or data jobs) as directed by the users/clients. In certain examples, the worker instances are a combination of virtual machines implemented by the underlying processing resources of the cloud computer system and the set of tasks or jobs that those virtual machines are programmed to execute. The virtual machines may be system virtual machines (e.g., that replicate the functionality of a "real" computer system and are thus fully virtualized) or process based virtual machines (e.g., that may execute computer programs in a platform independent manner). The worker instances may be created and destroyed as new instances are needed and the jobs that the instances are tasked with are completed.

In certain example embodiments, a cloud computer system that can create and destroy an arbitrary number of worker instances is provided. Each of the worker instances is assigned one or more jobs that receive input data, process the input data, and generate output (e.g., in the form of output data or a report of the output data). In certain example embodiments, a controller node (e.g., an instance of the cloud computer system tasked with controller functions) is tasked with creating, destroying, and/or controlling worker instances that will perform jobs based on input data. The controller node is programmed to request the creation of the arbitrary number of worker instances. Each of the worker instances then creates a corresponding input queue (e.g., where the respective worker instance will read input data from). Each worker instance also writes the location of the correspondingly created queue (e.g., a reference to that queue, such as a URL) and/or a pointer or other reference to the worker instance to a database. The creation of the worker instance and its subsequent communication with the database may be collectively referred to as the initiation phase of the worker instance. During the initiation phase, the controller periodically queries the database until all of the requested worker instances have populated the details of their respective instance and queue reference. Once the controller node has retrieved the references to the respective queues (e.g., the URLs) of the worker instances, it may then task the worker instances with jobs by publishing jobs to the queues associated with the worker instances.

In many places in this document, including but not limited to in the below descriptions of FIGS. 1-4, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 4.

Figure 1:
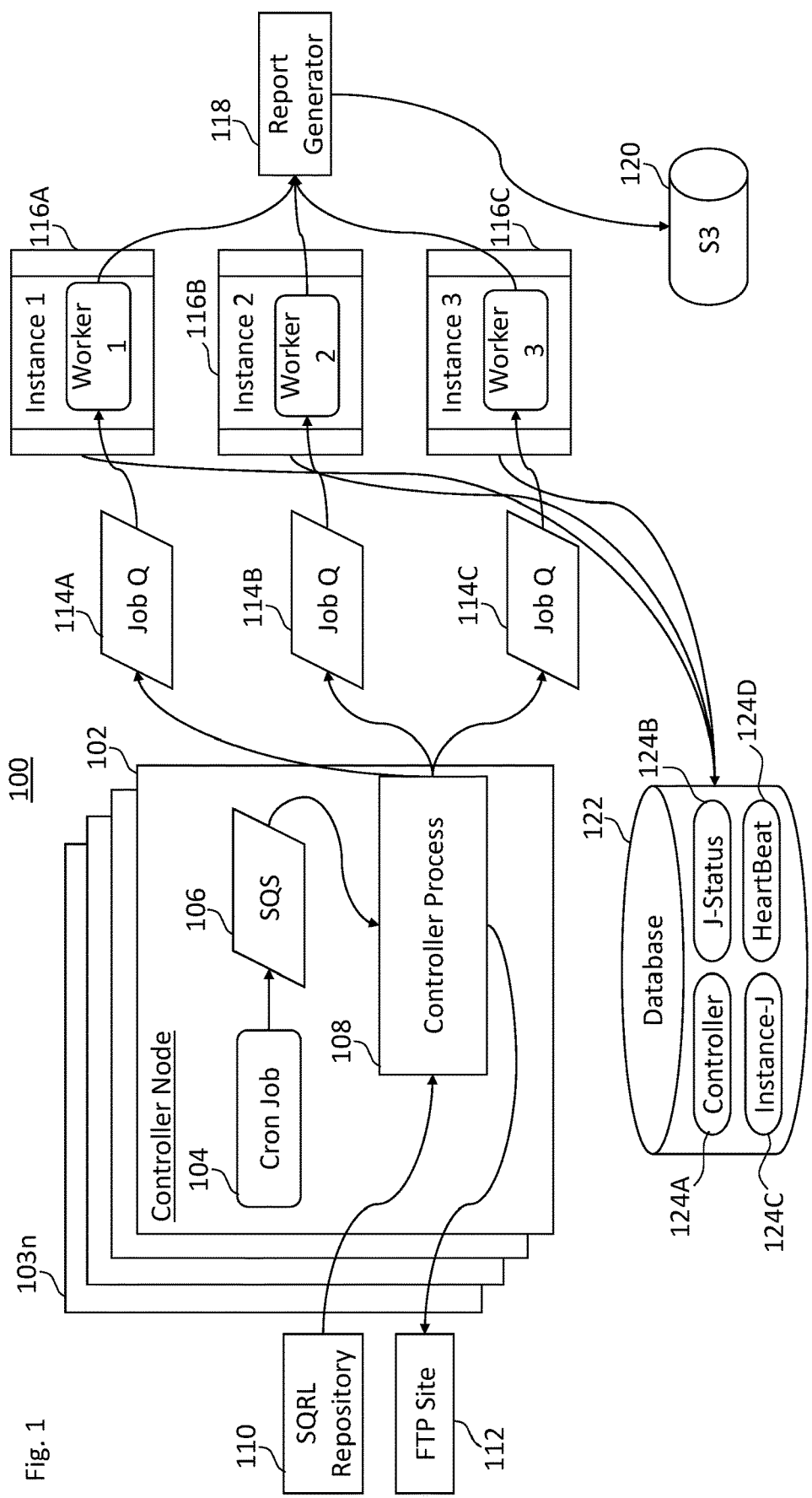
FIG. 1 shows an example system creating and scheduling multiple different processing instances and corresponding jobs for those instances.

Description of FIG. 1:

FIG. 1 shows an example cloud computer system for creating and scheduling multiple different processing instances (sometimes also referred to as "worker instances" or just "instances") and corresponding jobs for those instances. Cloud computer system 100 includes two main components. The first is the controller node (sometimes referred to as a controller instance herein) 102 and the second is worker instances 116A, 116B, and 116C that are dynamically created in response to a request by the controller node 102.

Controller node 102 is a virtual machine (or virtual container, or other virtual environment) instance that operates on one of a plurality of hardware computer nodes $103n$ that make up hardware computing resources of the cloud computer system 100. In certain examples, each of hardware computer nodes $103n$ are physical servers or computers (e.g., as shown in FIG. 4) that are coupled together via an electronic data communications network (e.g., gigabit Ethernet or other types of data communications technology)

The controller node 102 includes a controller process 108 that includes processing logic (e.g., a computer program) for requesting the creation of new worker instances, handling incoming data, distributing jobs, controlling the progression of the overall process and the progression of each job being performed by the cloud computing system 100 and the instances thereof, and the like.

Each worker instance 116A-116C is a combination of a virtual machine (e.g., an instance or container) and a process or thread (the worker) that is executing within that virtual machine. Thus, the instance and the executing worker are referred to as a worker instance that is able to process jobs and data posted to the corresponding queues 114A-114C. The worker instances are stateless immutable instances and wait until work (e.g., a job) is assigned to them using their respective queues 114A-114C. In certain example embodiments, the work is communicated to the queues in the form of JavaScript Object Notation (JSON) objects, which is a data-interchange format that can be human readable, but also easily parsed by a computer. Other types of data formats may also be used.

An example cloud computer system may be Amazon Web Services (AWS) cloud computer system that provides different types of instances depending on the processing requirements. In certain examples, each instance is supported by underlying processing resources (e.g., such as the computer system shown in FIG. 4). In certain examples, multiple different instances share the same underlying processing resources (e.g., are handled by the same computer device). In certain examples, the underlying hardware can be dedicated to a single instance. It will be appreciated that the flexibility of a cloud computer system architecture provides for a variety of different schemes for handling instances that are used to complete tasks or jobs.

In certain example embodiments, all of the instances (e.g. the worker instances and the controller instances) share a common system image (e.g., that is used across all of the different instances—including the controller node—created on the cloud computer system). Of the instances, the controller node is a long running instance and the worker instances are created and terminated by the controller process 108 on the controller node. In certain example embodiments, the controller instance autoscales to a group size of 1. This ensures the cloud computing system 100 will always have one instance of the controller instance running. In certain examples, when a newly created instance is started, it is passed (e.g., as part of its startup) the user data which indicates what role (controller or worker) that instance is to have. If the instance is marked as a controller node, the controller process may be started. However if the instance is a worker instance, then a service for a worker process is started. This type of deployment architecture may make it easier as only one image for the instances needs to be created.

The controller node 102 includes or stores a cron job 104, which is a script or process configured to run at predefined time periods (e.g., every night at 11 PM). In this example, the cron job 104 is used to signal the initiation of the process that takes input for a given date that produces reports for the data for that date. The cron job communicates to the controller process 108 via queue 106. In certain examples, the queue is implemented using a simple queue service (SQS) that is part of AWS.

Also included in the system 100 is an SQRL repository that provides for authentication and authorization services for users or clients that interact with the system 100. SQRL is an open standard for secure quick reliable login functionality for websites and the like. FTP site 112 is a storage area for storing reports and/or other output generated by using the system 100. Users can then access the FTP site 112 and retrieve the data (e.g., a generated report).

Report Generator 118 may be another instance (or part of the controller instance) that generates a finalized report from the data processed and output from the worker instances. For example, each worker instance may return or output a data list, and the report generator 118 may generate a report (e.g., in PDF form or a web page) from the outputted lists with charts and the like to visually show the result of the processing. The results of the report generator 118 and/or the output from the worker instances 116A-116C may be stored in intermediate storage 120. Database 122 and/or intermediate storage 120 may be used for storing data (e.g., in bulk form) processed by instances 116. In certain example implementations, database 122 is a dynamoDB that is available as part of cloud computer system offered by Amazon Web Services (AWS) and the intermediate storage 120 is S3 storage of AWS.

The database 122 may include multiple different database tables. A controller table 124A records or keeps track of the status of the controller and the overall status of a process (e.g., in the case that a report is being generated, it may keep track of the overall state of the report). Table 124A may include the following columns shown in Table 1 below:

TABLE 1

| Field | Description |
| --- | --- |
| Id | The instance identifier for the controller (currently only supports one). |
| Date | The reporting date for the currently executing report. |
| Init_Completed | Has the initialization phase been completed (e.g., all instances started and initial jobs published) |
| Sqrl_completed | Has the sqrl file been published to S3. |
| Reported_completed | Has the raw data version of the reports completed. |
| Reports_Published | Have the customer facing reports been published to the external FTP (e.g., 112). |
| Shutdown_Completed | Have the worker instances been shut down and the instance table been cleaned up. |

Another table 124B (the job status table) may be used to record what phase a certain process is in. In certain examples, for parallel overall processes, it may keep track of how many jobs there are and how many have been completed. In certain examples, there is one row per date and overall process. Table 124B may include the following columns shown in Table 2 below:

TABLE 2

| Field | Description |
| --- | --- |
| Date | Date for which the report phase executed. |
| Report | The name of the report being generated. |
| Phase | The phase of the report currently being executed. |
| Total | Total number of jobs that makes up this phase. |
| Started | How many of the jobs have started. If this number is greater than the finished amount it means some jobs are failing and are being retried. |
| Finished | How many jobs have been completed. |

Another table 124C (the instance job table) may be used to record what job an instance (e.g., a worker instance) is executing, when it started and when it finished. Table 124C may include the following columns shown in Table 3 below:

TABLE 3

| Field | Description |
| --- | --- |
| Instance | An instance id (e.g., an AWS instance id) |
| Queue_URL | URL of the queue for this worker instance |
| Job | Job message associated with the most current execution. |
| Started | Timestamp when the job started executing. |
| Finished | Timestamp when the job finished executing. |

An example job message may include the following values: 1) "command": "reportctl" (the command parameter specifies the type of work to do), "report": "mola" (the report parameter specifies the specific type of work to do), "phase": "report" (the phase parameter specifies which phase the report is current in—each report can have more than one phase), "partition": 1 (the partition parameter specifies how the data should be sliced), "date": "07202016" (the data parameter specifies the what day the data should be processed for).

Another table 124D may keep track of heartbeats from the worker instances 116A-116C. The following columns may be included as shown in Table 3 below:

TABLE 4

| Field | Description |
| --- | --- |
| Instance | An instance id (e.g., an AWS instance id) |
| Last_hb | YYYY-mm-dd HH:MM:SS of when the instance last reported a timestamp |

Figure 2:
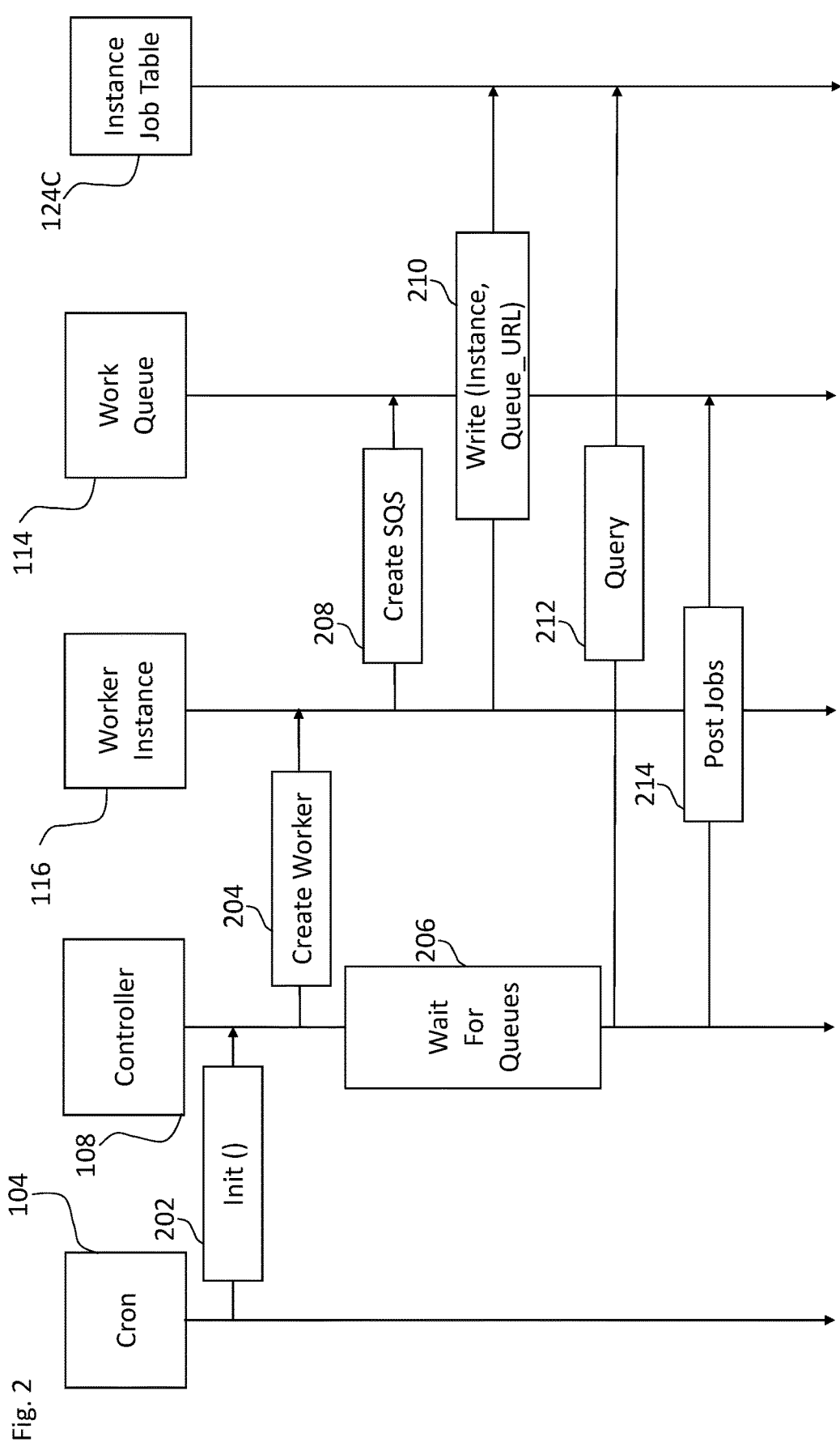
FIG. 2 shows a signal diagram of how the system in FIG. 1 is initialized according to certain example embodiments.

Description of FIG. 2:

FIG. 2 shows a signal diagram of how the system in FIG. 1 is initialized according to certain example embodiments.

At 202, the init phase 202 of the controller process 108 is triggered by cron job 102 that posts a message to the SQS that is associated with the controller process 108. An example message posted to the SQS of the controller process may include the following fields and data: 1) "type": "report"; and 2) "date": "07202106." The posting of the message via a cron job automates the starting of the process, along with automatically triggering the subsequent generation of the worker instances and jobs that are pushed to those instances. The message generated by the cron job and pushed to the queue may contain the date of the data that the process (e.g., a report process) will be analyzing. In response to this message, the controller process 108 initializes the system in preparation for running the jobs. As noted herein, the jobs may be all part of a larger task or process (e.g., a process that is to be distributed, in the form of the jobs, across the nodes of system 100) that may be, for example, to generate or run a report on an existing dataset.

One type of job may include the retrospective analysis process shown and described in co-pending application entitled "SYSTEMS AND METHODS OF RETROSPECTIVELY DETERMINING HOW SUBMITTED DATA TRANSACTION REQUESTS OPERATE AGAINST A DYNAMIC DATA STRUCTURE," U.S. application Ser. No. 15/896,875, the entire contents of which are hereby incorporated by reference. With such a job a client can request a report for missed opportunities and each individual job that is tasked to a different worker instance may be associated with a different ticker symbol (e.g., where the data operated on by a worker instance includes a data structure to be analyzed for an order book for a given ticker). One worker instance may run the retrospective process for ticker symbol AAA and other for BBB. The output from these multiple different worker instances may be combined into a report that is shown to the client (as shown in FIG. 5 of the above-noted co-pending application).

At 204, the controller process 108 begins starting worker instances 106. In certain examples this is done by invoking the appropriate API to the cloud computing system 100 to generate a requested number of worker instances. In certain examples, the controller process 108 may also dynamically determine the number of worker instances that are to be spawned based on the amount of processing that the jobs to be accomplished are expected to take. In other words, the number of worker instances that are needed for a given execution of the controller may be highly variable from one iteration to another (e.g., from one day to another). Thus, the controller process 108 may request the creation of 10 worker instances (or fewer) or the creation of 1000 worker instances (or more) depending on the amount of work that a given job(s) are expected to take. In certain example embodiments, the number of instances may be controlled via a configuration (e.g., a configuration file).

Once the creation of the worker instances have been initiated (or the request to create those instances has been acknowledged), then the controller waits at 206 until the worker instances have been created. This may include having the controller process 108 query database 122 to determine if and when the worker instances 116 have successfully registered themselves as described in connection with 208 and 210.

At 208, each newly created worker instance 208 creates its own corresponding work queue (e.g., an SQS) that may be unique for that queue. The work queue 114 is generally how data (e.g., a job) is communicated to each respective worker instance. In certain examples, the work queues are identified within the cloud computer environment by unique URLs. Once the work queue 114 is created and known, then the worker instance 116 writes or otherwise communicates with database 122 to write both the name of the correspondingly created work queue (e.g., a reference to that queue) and a reference to the corresponding work instance. This information is communicated to the instance job table 124C at 210 where that information is stored for future retrieval.

In certain examples, the processing for 208 and 210 occurs during an initialization phase for the worker instance. For example, an "init( )" function that is called with the worker instance is first started. In any event, during this period the controller process 108 continues to wait at 206. The waiting may include successive queries to the job instance table to determine if the worker instances have reported their respective information. Once such information is written to the job table, at 212, the controller process queries the database 122 to get references to the work queues (e.g., the URL) and/or associated worker instances. With this list the controller process 108 begins posting/submitting jobs to the work queues 114 at 214. In certain example embodiments, the process of posting jobs to the work queues is performed in a round robin manner.

Figure 3:
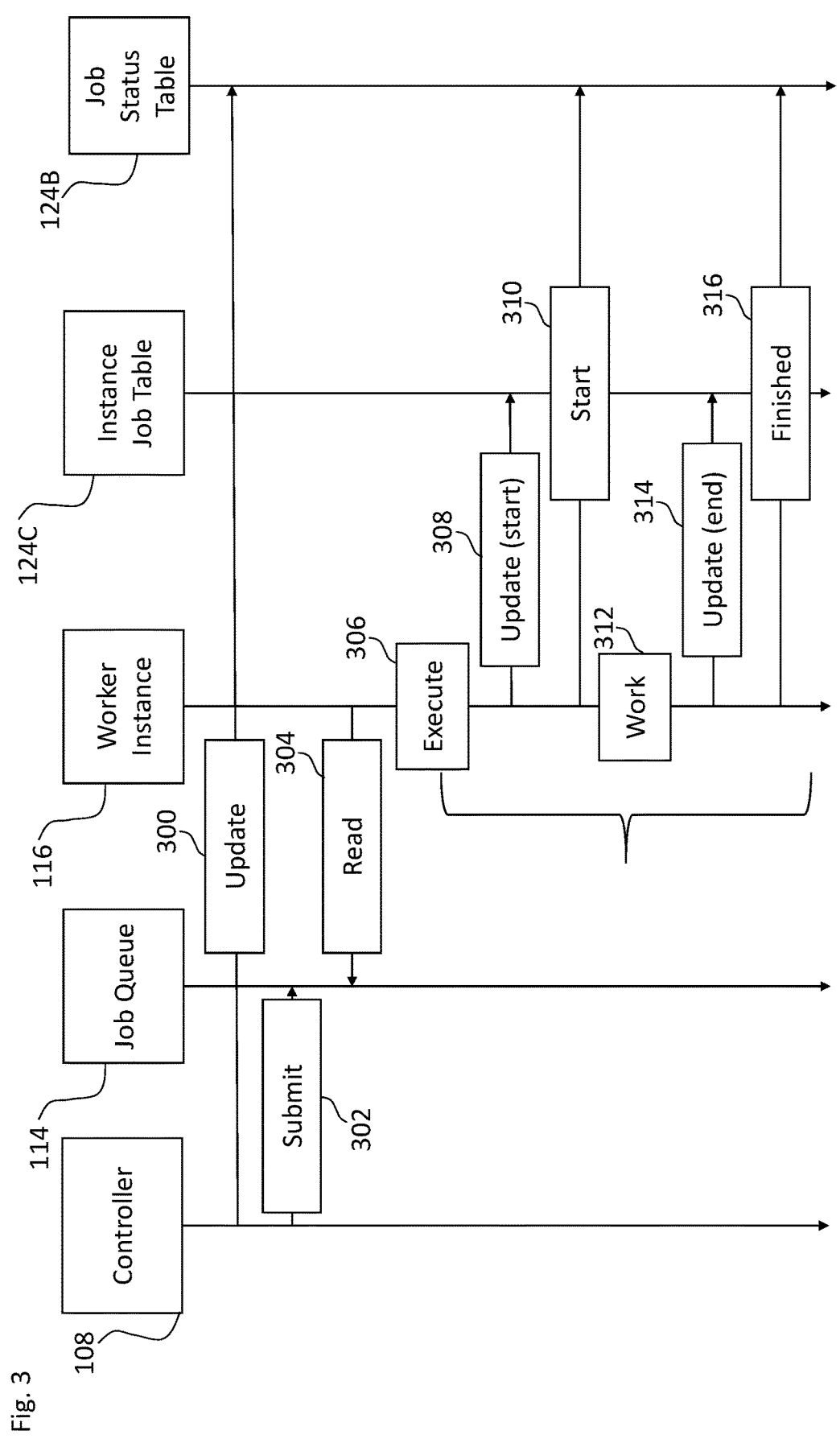
FIG. 3 shows how jobs are submitted to worker instances during a report generation phase according to certain example embodiments.

Description of FIG. 3:

FIG. 3 shows how jobs are submitted to worker instances during a report generation phase according to certain example embodiments.

At 300, the controller process 108 updates the job status table 124B of the database 122 with the total number of jobs for the phase and the phase name.

At 302, the controller process submits jobs as needed to by distributing them over the available job queues 114 (e.g., by using a round robin algorithm).

At 304, the worker instances read their respective queues, and at 306 the job that was submitted to the queue is executed by the worker instance. In accordance with starting the job at 306, the corresponding worker instance updates, at 308, the instance information in the instance job table to indicate what job the worker is running and when that job was started by the worker instance.

The processing for the received job is carried out at 312. Once the worker instance has completed the job, it updates the finished column in the job status table for the corresponding job at 316 and updates or sets the finished time in the job instance table.

In certain example embodiments, when a worker instance fails (e.g., there is no heartbeat within an amount of time such as, 30 seconds, 1 minute, 10 minutes, 1 hour, or a day or more), the controller runs a script that migrates all jobs from that worker instances to other job queues (or starts the process of creating additional worker instances). This includes unfinished jobs that the worker instances was executing as well as any pending jobs in the work queue for that instance. In other words, if a worker instance does not report its heartbeat and the last report is outside of a given threshold amount, the controller may migrate jobs previously assigned to that process to another worker instance.

In certain examples embodiments, the controller process may include a script (or the functionality therein) called report_controller.py. This script controls start and stop of the cluster (e.g., all of the instances—including the controller instance) and report jobs. When not invoked with the "-init" flag, the following is done: 1) Verify heartbeats from the worker instances; 2) check if any report has completed its current phase and if so, post a job for the next phase; 3) if all reports have finished their work, execute the publish job and shut down the worker instances.

In certain example embodiments, the following script may execute on each worker instances: worker_agent.py. This script has two functions: 1) run a thread that updates the heartbeat table 124D to indicate that the worker instance is still alive; and 2) read messages from the SQS and execute them using the reportctl.py script discussed below.

In certain example embodiments, a reportctl.py script may execute on each worker instance and execute a specific phase and partition of a report job. The script may take the following arguments: 1) report (indicates a given report that is to be run for the data); 2) phase (the phase of the report cycle that is to be executed; 3) date (Date to run the report for, either a date on 'mmddyyyy' format or 'today' for the current business day (mutually exclusive with the sqrlfile argument)—the script may fetch a sqrlfile if no date is present; 4) source (the source path of the report files to process); 5) target (Directory that files that are produced by the report phase are written to); 6) sqrlfile (can specify a sqrlfile instead of a date); 7) partition (Run a report for a specific partition—The partition is a number that represents a predefined symbol range with −1 being the default to indicate no partitioning); 8) symbol (Run a report for only one symbol—such as a ticker symbol); 9) publishType (Choose from which phase to publish data: report, convert, post, clientfile).

Description of FIG. 4

FIG. 4 is a block diagram of an example computing device 400 (which may also be referred to, for example, as a "computing device," "computer system," or "computing system") according to some embodiments. In some embodiments, the computing device 400 includes one or more of the following: one or more processors 402; one or more memory devices 404; one or more network interface devices 406; one or more display interfaces 408; and one or more user input adapters 410. Additionally, in some embodiments, the computing device 400 is connected to or includes a display device 412. As will explained below, these elements (e.g., the processors 402, memory devices 404, network interface devices 406, display interfaces 408, user input adapters 410, display device 412) are hardware devices (for example, electronic circuits or combinations of circuits) that are configured to perform various different functions for the computing device 400.

In some embodiments, each or any of the processors 402 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 402 uses an instruction set architecture such as x86 or Advanced RISC Machine (ARM). As explained herein, multiple computer systems may collectively form a cloud computer system and each one of the computer systems is configured to host one or more virtual machines (which are also referred as instances herein)

In some embodiments, each or any of the memory devices 404 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 402). Memory devices 404 are examples of electronic data storage and/or non-transitory computer-readable storage media.

In some embodiments, each or any of the network interface devices 406 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 408 is or includes one or more circuits that receive data from the processors 402, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 412, which displays the image data. Alternatively or additionally, in some embodiments, each or any of the display interfaces 408 is or includes, for example, a video card, video adapter, or graphics processing unit (GPU).

In some embodiments, each or any of the user input adapters 410 is or includes one or more circuits that receive and process user input data from one or more user input devices (not shown in FIG. 4) that are included in, attached to, or otherwise in communication with the computing device 400, and that output data based on the received input data to the processors 402. Alternatively or additionally, in some embodiments each or any of the user input adapters 410 is or includes, for example, a PS/2 interface, a USB interface, a touchscreen controller, or the like; and/or the user input adapters 410 facilitates input from user input devices (not shown in FIG. 4) such as, for example, a keyboard, mouse, trackpad, touchscreen, etc. . . . .

In some embodiments, the display device 412 may be a Liquid Crystal Display (LCD) display, Light Emitting Diode (LED) display, or other type of display device. In embodiments where the display device 412 is a component of the computing device 400 (e.g., the computing device and the display device are included in a unified housing), the display device 412 may be a touchscreen display or non-touchscreen display. In embodiments where the display device 412 is connected to the computing device 400 (e.g., is external to the computing device 400 and communicates with the computing device 400 via a wire and/or via wireless communication technology), the display device 412 is, for example, an external monitor, projector, television, display screen, etc. . . . .

In various embodiments, the computing device 400 includes one, or two, or three, four, or more of each or any of the above-mentioned elements (e.g., the processors 402, memory devices 404, network interface devices 406, display interfaces 408, and user input adapters 410). Alternatively or additionally, in some embodiments, the computing device 400 includes one or more of: a processing system that includes the processors 402; a memory or storage system that includes the memory devices 404; and a network interface system that includes the network interface devices 406.

The computing device 400 may be arranged, in various embodiments, in many different ways. As just one example, the computing device 400 may be arranged such that the processors 402 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 400 may be arranged such that: the processors 402 include two, three, four, five, or more multi-core processors; the network interface devices 406 include a first network interface device that implements Ethernet and a second network interface device that implements WiFi and/or Bluetooth; and the memory devices 404 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the controller node/instances 102, worker instances 116, controller process 108, database 122, cloud computer system 100, hardware computer nodes 103n, work queues 114, each of which will be referred to individually for clarity as a "component" for the remainder of this paragraph, are implemented using an example of the computing device 400 of FIG. 4 (or a plurality of such devices). In such embodiments, the following applies for each component: (a) the elements of the 400 computing device 400 shown in FIG. 4 (i.e., the one or more processors 402, one or more memory devices 404, one or more network interface devices 406, one or more display interfaces 408, and one or more user input adapters 410), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 404 (e.g., in various embodiments, in a volatile memory device such as a RAM or an instruction register and/or in a non-volatile memory device such as a flash memory or hard disk) and all actions described herein as performed by the software modules are performed by the processors 402 in conjunction with, as appropriate, the other elements in and/or connected to the computing device 400 (i.e., the network interface devices 406, display interfaces 408, user input adapters 410, and/or display device 412); (c) alternatively or additionally, to the extent it is described herein that the component processes and/or otherwise handles data, in some embodiments, such data is stored in the memory devices 404 (e.g., in some embodiments, in a volatile memory device such as a RAM and/or in a non-volatile memory device such as a flash memory or hard disk) and/or is processed/handled by the processors 402 in conjunction, as appropriate, the other elements in and/or connected to the computing device 400 (i.e., the network interface devices 406, display interfaces 408, user input adapters 410, and/or display device 412); (d) alternatively or additionally, in some embodiments, the memory devices 402 store instructions that, when executed by the processors 402, cause the processors 402 to perform, in conjunction with, as appropriate, the other elements in and/or connected to the computing device 400 (i.e., the memory devices 404, network interface devices 406, display interfaces 408, user input adapters 410, and/or display device 512), each or any combination of actions described herein as performed by the component and/or by any software modules described herein as included within the component.

Consistent with the preceding paragraph, as one example, in an embodiment where an instance of the computing device 400 is used to implement controller node 102, the memory devices 404 could load the files associated with the controller process, and/or store the data described herein as processed and/or otherwise handed off to work queues 114. Processors 402 could be used to operate the controller process 108.

The hardware configurations shown in FIG. 4 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 4, (e) via other hardware arrangements, architectures, and configurations, and/or via combinations of the technology described in (a) through (e).

Technical Advantages of Described Subject Matter

When working in a cloud based environment it can be technically advantageous if the techniques allow a given task or process to be able to dynamically scale up and down depending on the workload that is needed at a given point in time (e.g., the workload may dramatically vary from day-to-day). Such techniques should also advantageously be able to reprocess data in cases where one of the worker nodes fails at some point in the processing. Specifically, if one nodes of the cloud systems fails the outstanding (or incomplete) work for that nodes should be redistributed to other nodes.

In certain example embodiments, the subject matter described herein provides for a dynamic and flexible technique of handling variable computer-based processing requirements in a cloud computer system. In a typical scenario, a configuration file or the like keeps a list of possible worker instances (and their respective message queues). However, if the nature of the processing to be carried out varies from day to day, then that same configuration file will need to be updated (usually manually) to account for the changing availability of instances that can be used for processing. In certain example embodiments, once a worker instance is started by a controller instance, the worker instance self-registers with a database. The controller instance may then see that all of the worker instances that it spawned are ready (e.g., by querying the database). The controller instance can then retrieve the references to the message queues for the individual worker instances and begin publishing jobs to the queues. This allows the controller to not only create an arbitrary number of worker instances, but to also automatically submit jobs to those instances without having to manually set a reference to the queues for each of the worker instances.

The technical features described herein improve the reliability and flexibility in handling large scale and variable processing problems in a cloud or distributed computing context.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-3, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A cloud computer system comprising:
   a plurality of computer devices coupled together via an electronic data communications network, each of the plurality of computer devices having at least one hardware processor and a storage system, where at least one of the plurality of computer devices is configured as a controller node;
   a database stored on electronic data storage;
   the controller node being programmed to:
     accept a request to initiate a distributed process that includes a plurality of data jobs,
     determine a number of worker instances to create across the plurality of computer devices, and
     cause, for the determined number of worker instance, a plurality of worker instances to be created on the plurality of computer devices;
   each one of the plurality of worker instances being programmed to:
     create a unique message queue for the corresponding worker instance, and
     submit, to the database for storage therein, a reference for the unique message queue that was created for the corresponding worker instance;
   the controller node is further programmed to:
     retrieve each one of the references to the unique message queues for the plurality of created worker instances, and
     use the references to the unique message queues to publish the plurality of data jobs to corresponding ones of the unique message queues; and
   wherein each one of the plurality of worker instances is further programmed to read at least one data job contained in a corresponding unique message queue and process the read at least one data job.

2. The cloud computer system of claim 1, wherein each one of the plurality of worker instances is further programmed to:
   during processing of a corresponding data job, report a heartbeat signal to the database that indicates that the corresponding worker instance is working.

3. The cloud computer system of claim 2, wherein the controller node is further programmed to:
   determine, based on stored heart beat signals of the plurality of worker instances, that a last update for the heartbeat signal for a first worker instance is longer than a threshold time; and
   in response to determination that the first worker instance has not updated its heartbeat signal, publish the data job(s) that were published to the unique message queue of the first worker instance to another unique message queue that is associated with another worker instance.

4. The cloud computer system of claim 1, wherein the creation of the unique message queue and the submission of the reference are both executed during an initialization function for each corresponding worker instance.

5. The cloud computer system of claim 1, wherein the controller node is further programmed to:
   poll the database to determine when the reference for the unique message queue of each corresponding worker instance has been stored to the database.

6. The cloud computer system of claim 1, wherein the data jobs are published to the unique message queues using a round-robin process.

7. The cloud computer system of claim 1, wherein each one of the plurality of worker instances is further programmed to:
store, to the database and in association with the reference for the unique message queue, an instance identifier that uniquely identifies the created worker instance.

8. The cloud computer system of claim 1, wherein each one of the plurality of worker instances is shutdown or destroyed upon completion of the distributed process.

9. The cloud computer system of claim 8, wherein the distributed process is a process to generate at least one report based on an input data set.

10. The cloud computer system of claim 1, wherein the database includes a first table and each newly created worker instances is further programmed to submit a request that generates a new record for the first table with at least the following columns: 1) an instance identifier for the worker instance, 2) the reference for the unique message queue, 3) a job message that corresponds to a currently executing job for the worker instance, 4) a timestamp for a start time of the job, and 5) a timestamp for the completion of the job.

11. A method of operating a cloud computer system that includes a plurality of computer devices coupled together via an electronic data communications network, each of the plurality of computer devices having at least one hardware processor and a storage system, where at least one of the plurality of computer devices is configured as a controller node, the method comprising:
on the controller node, accepting a request to initiate a distributed process that includes a plurality of data jobs;
on the controller node, determining a number of worker instances to create across the plurality of computer devices;
on the controller node, requesting, for the determined number of worker instance, a plurality of worker instances to be created on the plurality of computer devices;
on each one of the plurality of worker instances that are executing in response to the request from the controller node:
(a) generating a unique message queue for the corresponding worker instance, and
(b) submitting, to a database of the cloud computer system for storage therein, a reference for the unique message queue that was created for the corresponding worker instance;
on the controller node, retrieving, from the database, each one of the references to the unique message queues for the plurality of created worker instances;
on the controller node, using the references to the unique message queues to publish the plurality of data jobs to corresponding ones of the unique message queues; and
on each one of the plurality of worker instances, reading at least one data job contained in a corresponding unique message queue and subsequently processing the at least one data job.

12. The method of claim 11, further comprising:
on each worker instance and at least during processing of a corresponding data job, reporting a heartbeat signal to the database that indicates that the corresponding worker instance is working.

13. The method of claim 12, further comprising:
determining, based on stored heart beat signals of the plurality of worker instances, that a last update for the heartbeat signal for a first worker instance is longer than a threshold time; and
in response to determination that the first worker instance has not updated its heartbeat signal, publishing the data job(s) that were published to the unique message queue of the first worker instance to another unique message queue that is associated with another worker instance.

14. The method of claim 11, wherein the creation of the unique message queue and the submission of the reference are both executed during an initialization process for each corresponding worker instance.

15. The method of claim 11, further comprising:
polling the database to determine when the reference for the unique message queue of each corresponding worker instance has been stored to the database.

16. The method of claim 11, wherein the data jobs are published to the unique message queues using a round-robin process.

17. The method of claim 11, further comprising:
on each of the worker instances, storing, to the database, an instance identifier that uniquely identifies the created worker instance with the reference for the unique message queue.

18. A non-transitory storage medium storing instructions for use with a cloud computer system that includes a plurality of computer devices coupled together via an electronic data communications network, each of the plurality of computer devices having at least one hardware processor and a storage system, where at least one of the plurality of computer devices is configured as a controller node, the stored instructions comprising instructions configured to:
accept a request to initiate a distributed process that includes a plurality of data jobs;
determine a number of worker instances to create across the plurality of computer devices;
cause, for the determined number of worker instance, a plurality of worker instances to be created on the plurality of computer devices;
as part of each worker instance, create a unique message queue for the corresponding worker instance;
as part of each worker instance, submit, to the database for storage therein, a reference for the unique message queue that was created for the corresponding worker instance;
as part of the controller instance, retrieve each one of the references to the unique message queues for the plurality of created worker instances;
as part of the controller instance, use the references to the unique message queues to publish the plurality of data jobs to corresponding ones of the unique message queues; and
as part of each worker instance, read at least one data job contained in a corresponding unique message queue and process the read at least one data job.

19. The non-transitory storage medium of claim 18, wherein the stored instructions comprise further instructions that are configured to:
during processing of a corresponding data job, report a heartbeat signal to the database that indicates that the corresponding worker instance is working;
determine, based on stored heart beat signals of the plurality of worker instances, that a last update for the heartbeat signal for a first worker instance is longer than a threshold time; and
in response to determination that the first worker instance has not updated its heartbeat signal, publish the data job(s) that were published to the unique message queue of the first worker instance to another unique message queue that is associated with another worker instance.

20. The non-transitory storage medium of claim 19, wherein the creation of the unique message queue and the submission of the reference are both executed during an initialization function for each corresponding worker instance.

\* \* \* \* \*